March 10, 1970 TAKAO MATSUI ET AL 3,500,117

PROTECTIVE DEVICE FOR TRANSISTORS FOR USE IN HORIZONTAL DEFLECTION CIRCUITS

Filed July 8, 1965 3 Sheets-Sheet 1

Takao Matsui
Tetsuo Saito
INVENTOR.

BY George B. Oujevolk
Attorney

Takao Matsui
Tetsuo Saito
INVENTOR.

BY George B. Oujevolk
Attorney

March 10, 1970 TAKAO MATSUI ET AL 3,500,117

PROTECTIVE DEVICE FOR TRANSISTORS FOR USE IN HORIZONTAL DEFLECTION CIRCUITS

Filed July 8, 1965 3 Sheets-Sheet 3

Takao Matsui
Tetsuo Saito
INVENTOR.

BY George B. Oujevolk
Attorney

United States Patent Office

3,500,117
Patented Mar. 10, 1970

3,500,117

PROTECTIVE DEVICE FOR TRANSISTORS FOR USE IN HORIZONTAL DEFLECTION CIRCUITS

Takao Matsui and Tetsuo Saito, Kawasaki-shi, Japan, assignors to Tokyo Shibaura Electric Co., Ltd., Kawasaki-shi, Japan, a corporation of Japan Filed July 8, 1965, Ser. No. 470,451
Claims priority, application Japan, July 14, 1964, 39/39,092
Int. Cl. H01j 29/70
U.S. Cl. 315—27 3 Claims

ABSTRACT OF THE DISCLOSURE

A protective device for a transistor for use in a horizontal deflection circuit wherein a voltage drop in case of a high voltage in an output circuit is produced in an impedance element, and when said voltage drop exceeds a predetermined value, a semiconductor element connected to a base electrode of said transistor is conducted so as to control an input of said transistor.

This invention relates to improvement relating to a protective device for transistors for use in horizontal deflection circuits and contemplates the prevention of damage or rupture of the horizontal output transistor caused by increased load current of the horizontal output transistor.

Generally, the neck portion of a cathode ray tube utilized in transistorized television receivers is made as small as possible in order to decrease the deflection power required, but with such a construction there is a tendency to strike an electric discharge within the cathode ray tube.

Further with the recent trend of miniaturizing transistor receivers, great efforts have been made to miniaturize high voltage circuits too. In such miniaturized circuits there is a danger of causing unwanted discharge between circuit components. Such a discharge in high voltage circuits will result in an extreme reduction of the impedance of the circuit as viewed from the primary side of the horizontal output transformer so that the current through the output transistor will be increased to increase the pulse voltage across the collector electrode and the base electrode, thus causing damage of the output transistor.

Semiconductor elements such as transistors can not withstand well against abnormal current and/or voltage when compared with electronic tubes, and hence are liable to be damaged by the effect of discharge current.

In one type of prior protective circuits for horizontal deflection output transistors, a Zener diode has been connected in parallel with a transistor for the purpose of suppressing abnormal voltages impressed across the collector and emitter electrodes, while in other types, for the purpose of suppressing reverse voltages impressed across the base and emitter electrodes of transistors, but it has been extremely difficult to positively protect output transistors.

The objects and advantages of the present invention will become apparent and this invention will be better understood from the following description, reference being made to the accompanying drawing. The features of novelty which characterize the invention are set forth in the claims annexed to and forming part of this specification. In the drawing:

Figure 1:
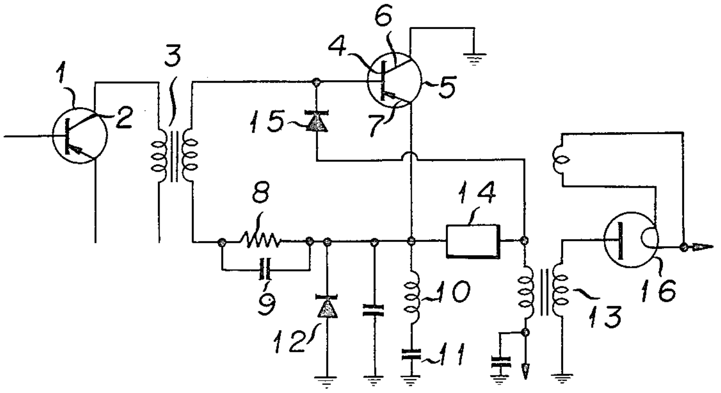
FIG. 1 is a circuit diagram of one example of a protective device for a transistor utilized in a horizontal deflection circuit, constructed in accordance with the principle of this invention.

Referring now to FIG. 1 of the accompanying drawing there is shown a drive transformer 3 with its primary winding connected to the collector electrode 2 of a drive transistor 1 and its secondary winding connected to the base electrode 4 of a horizontal output transistor 5, the collector electrode 6 thereof being grounded as shown.

The emitter electrode 7 of the horizontal output transistor 5 is connected to the opposite terminal of the secondary winding of the transformer via resistor 8 and a condenser 9 which are connected in parallel. The emitter electrode 7 is grounded through serially connected horizontal deflection coil 10 and a condenser 11. The primary winding of a horizontal output transformer 13 is connected to the emitter electrode 7 through a detector element 14 consisting of a suitable impedance, such as an inductance or a resistance and also to the base electrode 4 of the horizontal output transistor through a semiconductor element 15 such as a silicon diode poled as shown in case of short circuit or discharge in deflection coil or the seconday winding of transformer 13 for some reason, the large voltage drop between both terminals of the suitable impedance takes place. The secondary winding of the transformer 13 is connected to a high voltage rectifier 16 to complete a horizontal deflection circuit as in the usual manner.

The circuit constructed as above described operates as follows:

When the drive transistor 1 operates a current will flow through the primary winding of the drive transformer 3 to produce a required voltage on the secondary thereof. It is to be understood that this induced voltage is impressed across the base-emitter electrodes of the output transistor 5 in a direction to impress a reverse bias across the base-emitter electrodes. As a result when the drive transistor 1 becomes nonconductive a voltage in the opposite direction will be induced across the secondary winding of the transformer 3 which acts as a forward bias across the base-emitter electrodes of the output transistor 5. In this manner when the drive transistor 1 is conductive the output transistor 5 is rendered nonconductive whereas when the former is nonconductive the latter is made conductive, thus providing a switching action. The output transistor 5 and a damper impedance 12 cooperate to provide a required current of saw tooth wave form.

If it is now assumed that an electric discharge occurs in the high voltage circuit, the secondary side of the horizontal output transformer 13 will be instantly short circuited so that the impedance of the high voltage circuit as viewed from the primary side will decrease to a very small value. This results in a very large collector current of the horizontal output transistor 5. In this case since the drive current is selected to be large in order to decrease the fall time of the collector current, the collector current will reach to 2 to 3 times larger than the normal current.

Since this increased current flows through the primary winding of the horizontal output transformer 13 the current which flows through the detector element 14 will reach a value several tens times larger than the ordinary value.

If the semiconductor element 15 is a silicon diode which normally has a build up voltage of 0.6 to 0.8 volt in the forward direction, the silicon diode 15 would not conduct if the sum of the voltage drop across the detector element 14 due to a current normally flowing through the primary winding of the horizontal output transformer 13 and the voltage drop across base-emitter electrodes of the output transistor 5 were selected to be less than said build up voltage. Hence, diode 15 is normally operated with a slight forward bias but at a potential less than the knee of the diode current vs. voltage characteristic curve so that it has a relatively large impedance.

When the sum of the voltage drop across base-emiter electrodes of the output transistor 5 and the voltage drop appearing across the detector element 14 is larger than the forward build up voltage of the diode 15, the diode will become conductive, so that it is necessary to connect more than two diodes in series or to connect a suitable a resistor in parallel with the diode 15 in order to prevent such an undesirable conduction. Thereby, diode 15 is activated so that it operates beyond the knee of its characteristic curve and becomes a relatively low impedance to increase the amount of negative feedback.

However when the current flowing through the detector element 14 is increased, the voltage drop across the element 14 will render the semiconductor element 15 conductive to apply a negative feedback to the horizontal output transistor 5. Then the collector current will be increased to some extent but will never be increased beyond a certain limit thus effectively preventing the rupture of the horizontal output transistor 5.

Figure 2:
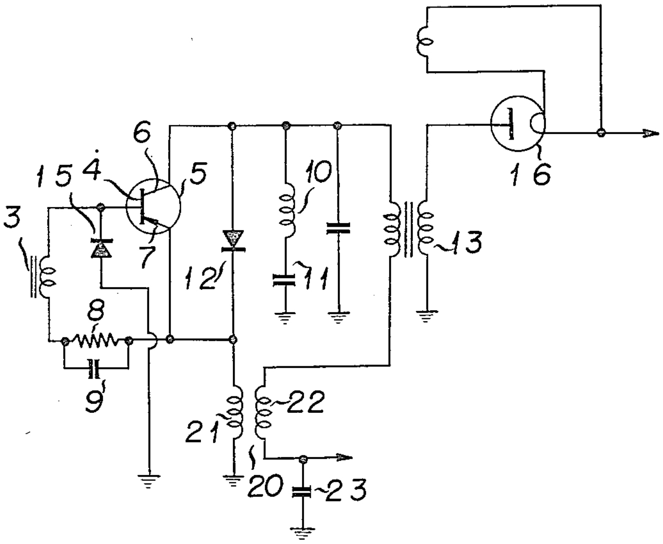
FIG. 2 shows a modification of the protective device shown in FIG. 1.

FIG. 2 shows a modified embodiment of this invention wherein the emitter side of an output transistor 5 is grounded, the collector side is floated and a transformer 20 is utilized as a detector element.

Thus in the modification shown in FIG. 2, the base electrode 4 of a horizontal output transistor 5 is connected to the secondary winding of a drive transformer 3 and the emitter electrode 7 of this transistor 5 is connected to the opposite terminal of the secondary winding of the drive transformer 3 through a resistor 8 and a condenser 9 which are connected in parallel.

The collector electrode 6 of the transistor 5 is grounded through a horizontal deflection coil 10 and a condenser 11. The collector electrode 6 is also connected to the anode electrode of a damper diode 12, the cathode electrode thereof being connected to the emitter electrode 7 of said transistor 5. The cathode electrode of the diode 12 is also grounded through a primary winding 21 of a transformer 20, one end of the secondary winding 22 being grounded through a condenser 23 while the other end being connected to the collector electrode 6 of the transistor 5 through a primary winding of the horizontal output transformer 13. The secondary winding of the output transformer 13 is connected to a high voltage rectifier 16. A semiconductor element 15 is connected between the base electrode 4 of the transistor 5 and the ground, having such a polarity as indicated to form a protective device for the transistor utilized in the horizontal deflection circuit.

The embodiment shown in FIG. 2 operates as follows: When a discharge occurs in the high voltage circuit a large collector current will flow through the horizontal output transistor 5 as in the first embodiment. As a result an increased current component will flow through the primary winding of the horizontal output transformer 13 and through the secondary winding 22 of the transformer 20. This current will induce a voltage of a predetermined value which causes the semiconductor element 12 to become conductive to feedback to the horizontal output transistor 5. Thus the drive current applied to the base electrode 4 of the horizontal output transistor 5 will be controlled as that the increase in the collector current is limited to a safe value not to destroy the horizontal output transistor 5. Utilization of the transformer

20 assures positive protective operation without accompanying undue increase of the lose.

Figure 3:
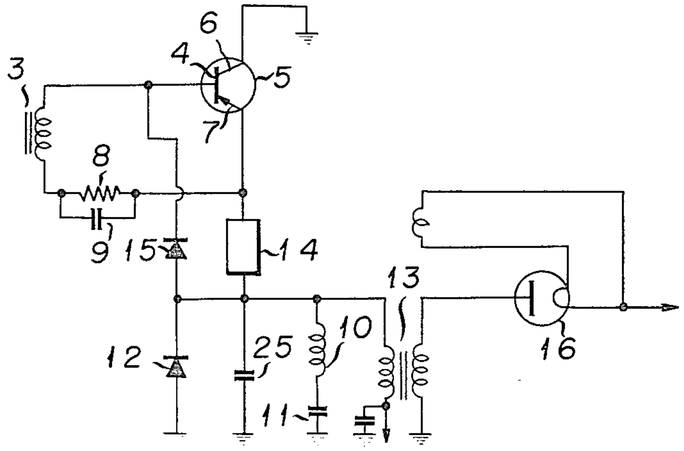
FIG. 3 shows a still further modification of this invention.

FIG. 3 illustrates still further modification of this invention wherein the increase in the collector current is detected to provide the required protective function. In this embodiment one terminal of the secondary winding of a drive transformer 3 is connected to the base electrode 4 of a horizontal output transistor 5, the collector electrode 6 thereof being grounded as shown. The emitter electrode 7 is connected to the opposite terminal of the secondary winding of said drive transformer 3 via a parallel connection of resistor 8 and a condenser 9. This emitter electrode 7 is also grounded through a detector element 14 and a condenser 25 which are connected in series. A common junction between the detector element 14 and the condenser 25 is connected to a horizontal deflection coil 10 and to one terminal of the primary winding of a horizontal output transformer 13. Further, the cathode electrode of a semiconductor element 15 is connected to the base electrode 4 of said horizontal output transistor 5 while the anode electrode of semiconductor element 15 is grounded through a damper diode 12 to comprise a protective circuit for the transistor 13 utilized in the horizontal deflection circuit.

When a discharge occurs in the high voltage circuit of this embodiment the secondary side of the horizontal output transformer will be short-circuited instantly so that the impedance of the high voltage circuit as viewed from the primary side will be decreased to a very small value. Consequently, a large current will flow through the horizontal output transistor 5. Thus, the current flowing through the detector element 14 will be increased to render conductive the diode thereby effectively preventing rupture of the horizontal output transistor 5.

According to this embodiment it is not only possible to prevent the rupture of the output transistor 5 due to discharge in the high voltage circuit but also to prevent rupture of the horizontal output transistor 5 due to short circuit between turns of the deflection coil 10. Moreover when a mesa type transistor is used wherein its stem is utilized as the collector electrode it is possible to readily ground the collector electrode and provide an adequate heat dissipation effect by merely securing the stem to a chassis.

Figure 4:
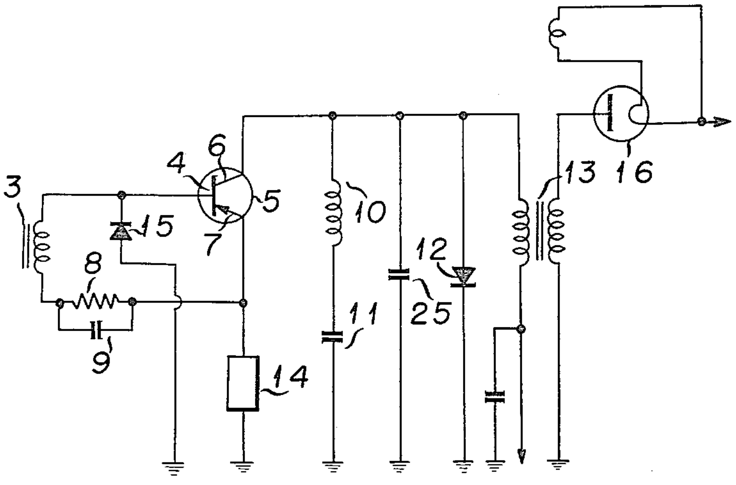
FIG. 4 shows another embodiment of this invention.

Referring to FIG. 4 wherein the emitter side of the horizontal output transistor 5 is grounded, one terminal of the secondary winding of a drive transformer 3 is connected to the base electrode 4 of a horizontal output transistor 5 and the collector electrode 6 is connected to one terminal of the primary winding of a horizontal output transformer 13. The emitter electrode 7 of the transistor 5 is connected to the opposite terminal of the secondary winding of the drive transformer 3 through a resistor 8 and a condenser 9 which are connected in parallel. The emitter electrode 7 is also grounded through a detector element 14. The collector electrode 6 is grounded through a condenser 25 and a damper diode 12, respectively. The collector electrode 6 is also grounded through a horizontal deflection coil 10 and a condenser 11 which are connected in series. The base electrode 4 of the transistor 5 is grounded through a semiconductor element 15 poled as shown. Like the foregoing examples a high voltage rectifier 16 is energized by the secondary winding of the output transformer 13.

Also in this example, the occurrence of a short circuit in the high voltage circuit causes the secondary side of the horizontal output transformer 13 to be instantly short-circuited thereby to decrease the impedance as viewed from the primary side. As a result a very large collector current will flow through the horizontal output transistor 5. This will result in the increase of the voltage drop across the detector element 14 so as to render conductive the semiconductor element 15 to effectively prevent the horizontal output transistor 5 from rupturing.

In addition it is also possible to prevent the rupture of the horizontal output transistor due to short-circuit between turns of the deflection coil.

Figure 5:
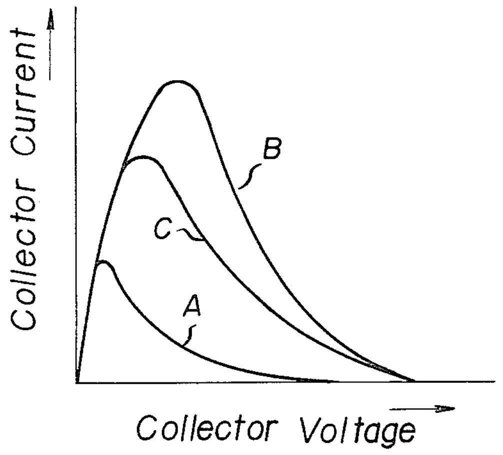
FIG. 5 shows a group of curves useful to explain the operation of the protective device of this invention.

A comparison of this circuit and the prior circuit will be made by referring to FIG. 5 which shows load curves of a horizontal output transistor wherein the ordinate indicates collector currents and the abscissa collector voltages. The collector current in the normal condition is represented by a curve A. Upon the occurrence of an abnormal condition such as a short circuit in the high voltage circuit, the collector current varies according to a curve B in an ordinary circuit not provided with the protective device of this circuit, thus rupturing the output transistor. However by providing the protective device of the invention the collector current is reduced as indicated by a curve C thus effectively protecting the output transistor from rupturing.

Thus it will be seen that the invention provides a protective device of transistors utilized in horizontal deflection circuits which can effectively prevent the horizontal output transistors against such faults as short circuit or discharge in the high voltage circuit or the deflection coil. Moreover it is possible to provide transistorized television receivers which can be used over a long time without repair or with minimum cost of repair.

While the invention has been explained by describing particular embodiments thereof, it will be apparent that improvements and modifications may be made therein without departing from the scope of the invention as defined in the appended claims.

What is claimed is:

1. A high voltage cathode ray deflection circuit and power supply comprising a transistor, a deflection coil connected in the emitter collector path of said transistor, a high voltage transformer connected in the emitter collector path of said transistor, a cathode ray tube high voltage power supply responsive to said transformer, means for switching said transistor between forward and back biased conditions to produce a saw tooth current in said coil, a D.C. power supply, means for connecting both said coil and transformer to one terminal of said supply and one electrode of said transistor so that said coil is charged in response to current flowing from said supply through said transformer while said transistor is back biased and for discharging the current in the coil through the transistor while the transistor is forward biased, said transistor being susceptible to drawing currents destructive thereto in response to high voltage discharges across said transformer and coil; the improvement comprising means for substantially limiting the amplitude of said destructive currents, said limiting means including: a silicon diode shunting the emitter base path of said transistor and poled in the same direction as the transistor base emitter junction, said diode being a relatively high impedance during normal circuit operation by having a voltage current characteristic with a knee at a forward bias potential substantially greater than zero, a negative feedback path connected in the base emitter path of said transistor, said feedback path including impedance means for deriving a negative feedback voltage for the transistor emitter base junction in response to one of said high voltages discharges, said feedback voltage being derived in response to one of said discharges and being of such polarity and amplitude as to drive said diode into a forward biased condition beyond said knee to increase the negative feedback sufficiently to tend to cut off said transistor and thereby prevent destruction thereof.

2. The circuit of claim 1 wherein said impedance means is a resistor.

3. The circuit of claim 1 wherein said impedance means is an inductor.

References Cited

UNITED STATES PATENTS

| | | |
|---|---|---|
| 2,964,674 | 12/1960 | Murakami et al. |
| 2,810,080 | 10/1957 | Trousdale. |
| 2,814,736 | 11/1959 | Hamilton. |
| 2,926,284 | 2/1960 | Finkelstein. |
| 3,179,843 | 4/1965 | Schwartz. |

RICHARD A. FARLEY, Primary Examiner

J. G. BAXTER, Assistant Examiner